Patented Apr. 4, 1933

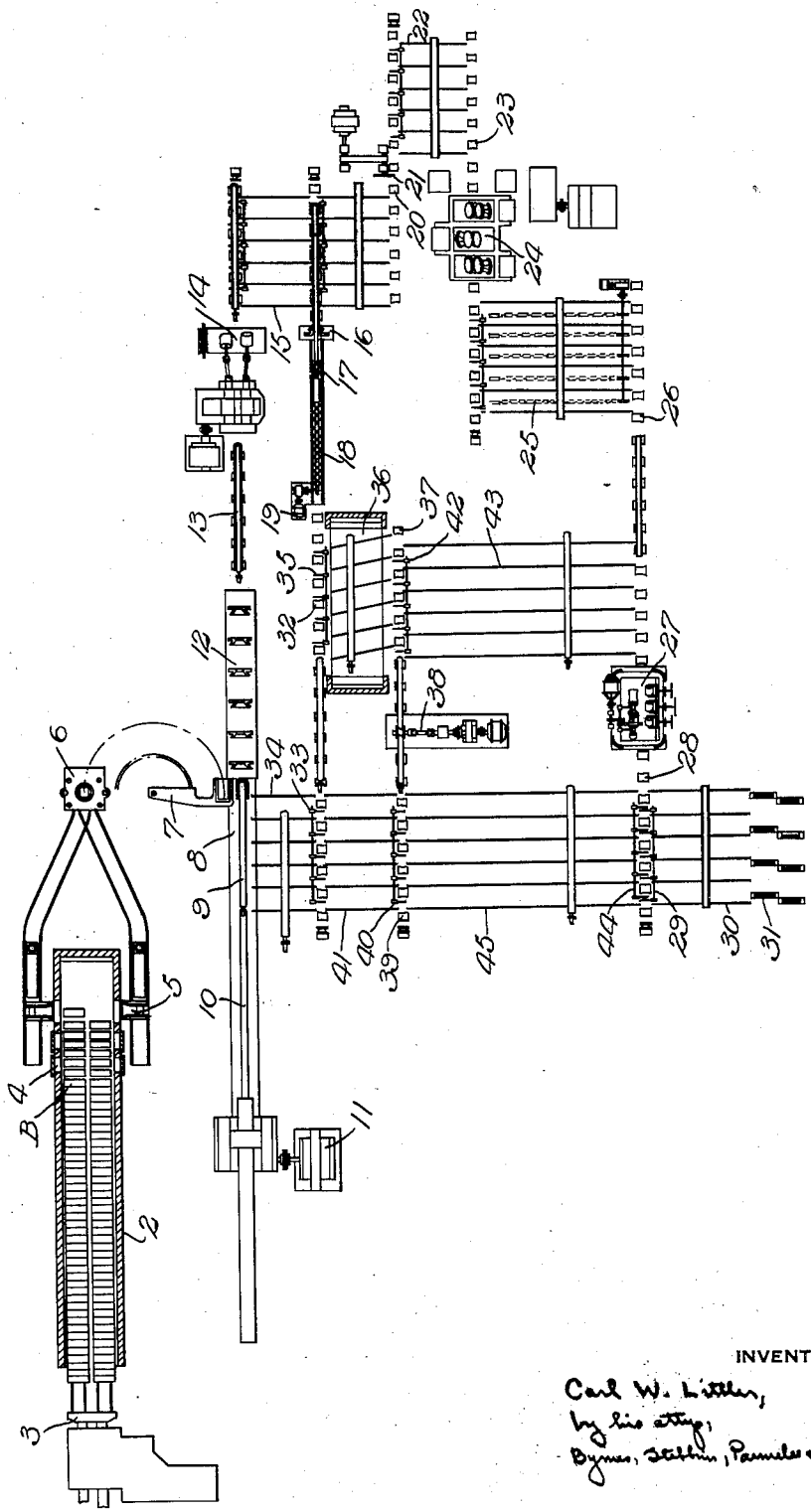

1,903,296

UNITED STATES PATENT OFFICE

CARL W. LITTLER, OF PITTSBURGH, PENNSYLVANIA, ASSIGNOR TO JONES & LAUGHLIN STEEL CORPORATION, OF PITTSBURGH, PENNSYLVANIA, A CORPORATION OF PENNSYLVANIA

APPARATUS FOR TUBE MANUFACTURE

Application filed May 9, 1931. Serial No. 536,142.

This invention relates to apparatus for tube manufacture and more particularly to the manufacture of tubes by the push bench process. The word "tubes" is used as a term of general definition and is not to be taken as limited only to hollow bodies falling within the commercial classification of "tubes".

In the manufacture of tubes by the push bench process a hollow bottle, heated, is placed on the end of a mandrel and pushed through a set of dies on a ring bench, which dies thin and elongate the bottle into a tube. This tube is stripped from the mandrel and is subjected to after operations for making it commercial. The mandrel is returned to the push bench for further use. Great care must be employed in keeping the mandrels in proper condition if the most satisfactory results are to be obtained. It is important that the mandrels be kept straight and true to size. Unfortunately, as the installation is enlarged to manufacture tubes of large diameters, the expense of machines for sizing and straightening the mandrels increases very greatly. The installation described and claimed herein eliminates a large item of expense by making it possible to straighten both the tubes and the mandrels on the same machine, thus materially reducing the capital investment.

The accompanying figure of drawing is a diagram showing a present preferred embodiment of the invention.

The drawing shows a heating furnace 2 through which billets B are fed by a pusher 3. As the billets approach the right-hand end of the furnace they are engaged through doors 4 by tongs in the hands of workmen and separated so as to make the heating more uniform. The heated billets are discharged to buggies 5 which convey them to a press 6. In this press the billets are punched for a major portion of their depth to produce a hollow body closed at one end, usually termed a "bottle". The bottle is carried by an arm 7 to the push bench 8. It is there placed over the nose of a mandrel 9 on a pusher 10. The pusher is actuated by a motor 11 and moves the mandrel 9 to the right, forcing the bottle through a series of dies on a ring bench 12, thus forming a tube over the mandrel as indicated at 13. This tube is fed through a reeler 14 as more particularly described in Peters Patent No. 1,720,345, which reeler serves to loosen the tube on the mandrel. It is then carried over skids 15 to a position in alinement with a stripping die 16 where the rear end of the mandrel is engaged by a tongs 17. The tongs 17 is connected by a chain 18 to a motor 19 effective for pulling the mandrel out of the loosened tube. The tube is conveyed to troughed rollers 20 on which it is supported while the ends are cut off by a hot saw 21. The tube is then moved over skids 22 to rollers 23 and thence through a sizing mill 24. A drag-over 25 then conveys it to rollers 26 which feed it to a straightening machine 27. After the tube issues from the straightening machine it is supported on rollers 28 and a kick-up 29 lifts it onto skids 30 over which it rolls to cradles 31. After a number of tubes have been collected in a cradle they are picked up by the crane and taken away.

After the mandrel has been pulled through the stripping die 16 it is delivered onto troughed rollers 32 and may, if desired, be carried directly forward to a point to be engaged by a kick-off 33 which delivers it to skids 34 extending back to the push bench 8. Generally, however, it will be desired to employ a kick-off 35 which feeds the mandrel from the rollers 32 to a heating furnace 36. As more fully described and claimed in my copending application Serial No. 513,307, filed February 4, 1931, the heating furnace 36 equalizes the temperature throughout the mandrel. After discharge from the heating furnace 36 it is delivered onto rollers 37 from which it may be fed through a sizing mill 38 to troughed rollers 39 from which a kick-off 40 discharges it to skids 41 in alinement with the skids 34. The sizing mill 38 is effective for rounding and equalizing the diameter of the mandrel throughout; but in the event of the mandrel becoming bent or bowed, it is necessary to straighten it before further use.

The mandrels to be straightened are lifted off the rollers 37 by a kick-off 42 onto skids 43 extending to the train of rollers 26. The skids 43 are of considerable length so that a number of mandrels may be accumulated thereon if desired. It may or may not be necessary to adjust the straightening machine for these mandrels, depending on the amount of reduction effected in the sizing mill 24.

After the mandrels have been straightened they are taken off the rollers 28 by a kick-off 44 and delivered to skids 45 in alinement with the skids 34 and 41. If desired, the mandrels may be fed directly back from the straightening machine to the push bench, or they may be carried to the rollers 32 which will be driven in a reverse direction to bring the straightened mandrels in alinement with the furnace 36 wherein they are reheated and fed through the sizing mill 38 prior to use.

I have illustrated and described the present preferred embodiment of the invention, but it will be understood that it is not limited to the form shown as it may be otherwise embodied within the scope of the following claims.

I claim:

1. Apparatus for tube manufacture comprising a push bench wherein tubes are formed over mandrels, means for stripping the tubes from the mandrels, a straightening machine, means for conveying the formed tubes from the stripping means to the straightening machine, means for conveying the mandrels thereto from the stripping means, and means for returning straightened mandrels from the straightening machine to a position for use in the push bench.

2. Apparatus for tube manufacture comprising a push bench wherein tubes are formed over mandrels, means for stripping the tubes from the mandrels, a straightening machine, means for conveying the formed tubes from the stripping means to the straightening machine, means for conveying the mandrels thereto from the stripping means, and means for returning straightened mandrels from the straightening machine to a position for use in the push bench, the means for conveying the mandrels from the stripping means to the straightening machine being of such character as to accommodate a plurality of mandrels to be straightened.

3. Apparatus for tube manufacture comprising a push bench wherein tubes are formed over mandrels, means for stripping the tubes from the mandrels, a straightening machine, means for conveying the formed tubes after they have been stripped from the mandrels to the straightening machine, and means for conveying mandrels after tubes have been stripped therefrom to the straightening machine.

4. Apparatus for tube manufacture comprising a push bench wherein tubes are formed over mandrels, a reeler so positioned as to receive mandrels with tubes thereon after they leave the push bench, means beyond the reeler for stripping tubes from the mandrel, a straightening machine, means for conveying mandrels from the stripping means after tubes have been stripped therefrom to the straightening machine, and means for conveying mandrels from the straightening machine to a position for use in the push bench.

5. Apparatus for tube manufacture comprising a push bench wherein tubes are formed over mandrels, means for stripping the tubes from the mandrels, a straightening machine, means for conveying the formed tubes to the straightening machine, means for conveying the mandrels thereto, and means beyond the straightening machine for directing straightened mandrels in one path and straightened tubes in another path.

6. Apparatus for tube manufacture comprising a push bench wherein tubes are formed over mandrels, means for stripping the tubes from the mandrels, a straightening machine, means for conveying tubes from the stripping means to the straightening machine, and means for conveying mandrels from the stripping means to the push bench, the last-mentioned conveying means being arranged to direct mandrels through the straightening machine.

7. Apparatus for tube manufacture comprising a push bench wherein tubes are formed over mandrels, means for stripping the tubes from the mandrels, a straightening machine, means for conveying the formed tubes to the straightening machine, means for conveying the mandrels thereto, and mandrel heating means in the last-mentioned conveying means.

8. Apparatus for tube manufacture comprising a push bench wherein tubes are formed over mandrels, means for stripping the tubes from the mandrels, a straightening machine, means for conveying the formed tubes to the straightening machine, means for conveying mandrels from the stripping means to the push bench, sizing means for the mandrels, means for conveying mandrels to the straightening machine, and means whereby the straightened mandrels may be fed to the sizing means.

In testimony whereof I have hereunto set my hand.

CARL W. LITTLER.